United States Patent Office 2,855,852
Patented Oct. 14, 1958

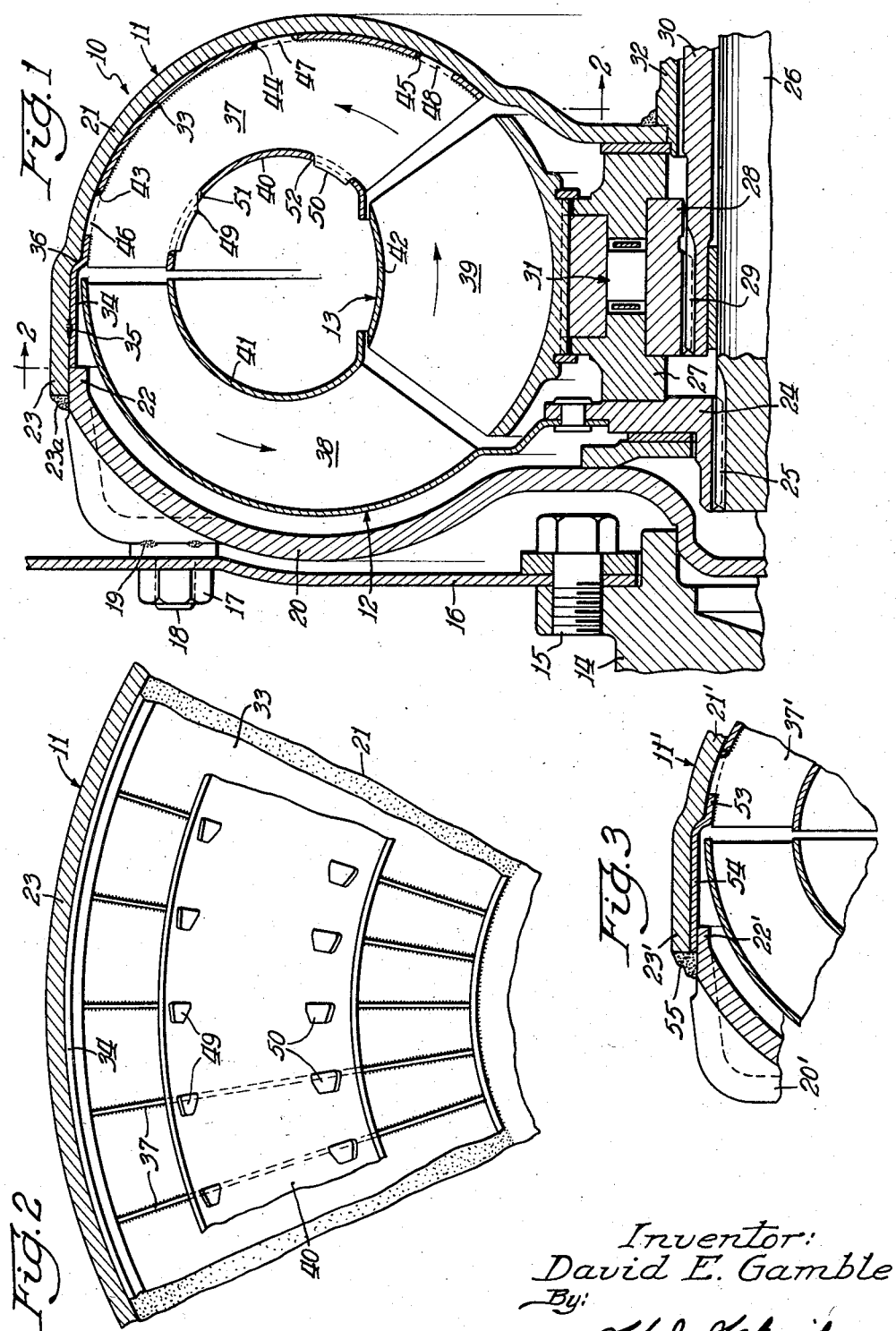

2,855,852

HYDRODYNAMIC COUPLING DEVICES

David E. Gamble, Tucson, Ariz., assignor to Borg-Warner Corporation, Chicago, Ill., a corporation of Illinois Application July 15, 1955, Serial No. 522,323

5 Claims. (Cl. 103—115)

This invention relates to hydrodynamic coupling devices and more particularly to such coupling devices for transmitting torque between vaned elements placed adjacent each other and operating by circulation of fluid in a closed toroidal fluid circuit.

An object of the invention is to provide improved hydrodynamic coupling devices.

Another object of the invention is to provide an improved hydrodynamic coupling device including a fluid-containing housing rotatable about an axis and formed of semi-toroidal casings in telescoping relation, one casing providing a vaned assembly cooperating with the other casing to position the casings in predetermined axial relation.

Another object of the invention is to provide an improved hydrodynamic coupling device comprising a plurality of semi-toroidal casings having telescoping flanges, one of the casings containing a vaned assembly having a flange co-extensive with the flange thereon with the vaned assembly being held in position in the casing by a continuous weld extending about the circumference of the casings and uniting the flanges of the casings and the vaned assembly.

Another object of the invention is to provide improved vaned elements of hydrodynamic coupling devices including a plurality of nested and connected semi-toroidal shells, and vanes positioned in the inner shell and having tabs extending into slots in the inner shell.

Another object of the invention is to provide improved vaned elements as described wherein the inner and outer shells are connected by a cement which is also effective to provide a seal between the engaging portions of the vanes and the inner shell.

A further object of the invention is to provide an improved vaned element completely formed of sheet metal stampings which may be readily and economically manufactured and assembled and have the required strength to withstand the forces of the circulating fluid on the vanes during the transmission of torque.

These and other objects and features of the invention will become apparent from the following description taken together with the accompanying drawings in which:

Fig. 1 is an axial section of a fragmentary portion, preferably the upper half, of a hydrodynamic coupling device, including a fluid-containing housing and an impeller forming a portion thereof, embodying the invention;

Fig. 2 is an elevational view of the impeller shown in Fig. 1 and according to line 2—2 in Fig. 1;

Fig. 3 is a fragmentary portion of a hydrodynamic coupling device illustrating a modification of the invention.

The drawings are to be understood as being more or less of a schematic character for the purpose of disclosing typical or preferred forms of the improvements contemplated herein, and in these drawings like reference characters identify the same parts in the different views.

Referring now to the drawing, the hydrodynamic coupling device, shown in Fig. 1, is of the torque-multiplying type and is generally indicated at 10. The device comprises a vaned driving element or impeller 11, a vaned driven element or turbine 12, and a vaned reaction element or stator 13, which constitute the three elements ordinarily found in a hydrodynamic torque converter, with the impeller functioning to impart energy to a body of liquid in the torque converter, the driven or runner element receiving energy from the liquid, and the stator being held from rotation and functioning as a reaction element to change the direction of the flow of the liquid so that the coupling functions to multiply torque.

The impeller is connected to an engine (not shown) having a shaft 14 driven thereby provided with a flange connected by bolts 15, to a drive plate 16 which, in turn, is bolted as at 17 to studs 18 welded as at 19 to a fluid-containing housing of the torque converter comprising telescoping casings in the form of a drive plate 20 having the studs 19 welded thereto, and a shell 21 of the impeller 11. The drive plate 20 and the impeller shell 21 are each of semi-toroidal shape having annular radially outer and axially extending telescoping flanges 22 and 23, respectively, secured together by a continuous weld 23a surrounding the circumference of the annular flange 22 of the drive plate 20 and engaging the outer edge of the annular flange 23 of the shell 21 to drivingly connect the plate 20 to the shell 21 of the impeller and to provide a fluid-tight connection between the plate 20 and the shell 21 to prevent the escape of fluid from the interior of the housing outwardly between the flanges 22 and 23. It will thus be seen that the drive plate 20 and the shell 21 form a fluid chamber in which are disposed the turbine 12 and the stator 13. The turbine 12 is provided with a hub 24 splined as at 25 to a driven shaft 26. The stator 13 has a hub 27 rotatably mounted on a collar 28 splined as at 29 to a stationary sleeve 30 of a transmission housing (not shown), the hub of the stator having an overrunning clutch 31 of the sprag type associated therewith and engaging the stationary collar 28 to prevent rotation of the stator in one direction of rotation during the torque-multiplication stages of the torque converter, the clutch overrunning to permit rotation of the stator in an opposite direction of rotation upon the impeller and runner obtaining substantially the same speed, as is well known in the art. The casing 21 of the impeller 11 has a hub 32 rotatably mounted upon the stationary sleeve 30.

The present invention is directed to the vaned element or impeller 11 and the cooperation of its structure with the drive plate 20. The impeller 11 comprises the substantially semi-toroidal shell 21 and a vaned assembly positioned therein and secured thereto. The vaned assembly comprises a thin sheet metal stamping forming a shell 33 of substantially semi-toroidal form and having the outer surface thereof conforming to the curvature of the inner surface of the shell 21 to snugly engage the same, the radially outer portion of the shell 33 terminating in an annular flange 34 radially inwardly of the flange 23 of the shell 21 with the outer surface of the shell 33 engaging the inner surface of the flange 23 of the shell 21 and being connected thereto by a plurality of circumferentially spaced welds 35. The shells 21 and 33 are provided with interengaging shoulders as at 36 and assisting in positioning semi-toroidal surfaces of the shells 21 and 33 for engagement with each other during assembly of the shells. The flange 34 terminates short of the end of the flange 23 and abuts the outer peripheral edge of the drive plate 20 to position the drive plate 20 in predetermined axially spaced relationship to the turbine 12 by the engagement of the contiguous outer peripheral edges of the drive plate 20 and the shell 33.

The impeller 11 further comprises a plurality of radially extending vanes 37 in circumferentially spaced relation of the shell 33 and cooperating with vanes 38 of the turbine 12 and vanes 39 of the stator 13 to provide for the continuous circulation of the fluid as indicated by the direction of the arrows during the transmission of torque by the converter. The inner edges of the respective vanes 37, 38 and 39 are provided with core rings 40, 41 and 42. As seen in Figs. 1 and 2, the radially inner edge of the shell 33 terminates in the plane in which the radially inner edges of the blades 37 lie and adjacent the end of the substantially semi-toroidal surface of the shell 21. The shell 33 is provided with a plurality of circumferentially spaced sets of radially spaced recesses or slots 43, 44 and 45 for receiving tabs 46, 47 and 48 on the vanes 37 which are formed preferably of sheet metal and of thin cross-section to provide a multiplicity of closely spaced vanes. It will be apparent each vane has a plurality of tabs 46, 47, and 48 extending through the openings 43, 44 and 45 in the shell 33 with the ends of the tabs engaging the inner semi-toroidal surface of the shell 21, each of the vanes having an outer arcuate edge having a curvature conforming to the curvature of the engaged inner surface of the shell 33. The vanes 37 are also provided with tabs 49 and 50 on their inner edge or margin extending through openings 51 and 52 in the core ring 40 with the tabs being bent over to lie against the inner surface of the core ring as shown in Figs. 1 and 2, the core ring being a thin sheet metal stamping.

If desired, the shell 33 of the vaned assembly may have its outer surface cemented to the inner surface of the shell 21 by any suitable cement, and the cement may also be applied between the inner surface of the shell 33 and the engaging portions of the vanes to provide a seal preventing the flow of fluid therebetween.

In the assembly of the impeller 11, the vanes 37 may be inserted within the shell 33 with the tabs thereof located in the openings of the shell and thereafter the core ring may be engaged with the inner arcuate margins of the vanes with the tabs of the vanes extending through the slots in the core ring and being bent over to lie against the inner surface of the core ring. This provides an assembly of the vanes 37, shell 33 and core ring 40 which can be handled as a unit as the core ring and its cooperation with the tabs on the vanes will maintain the vanes in assembly with the core ring, as well as with the shell 33. This vaned assembly may then be positioned within the shell 21 and the radially outer telescoping annular flanges of the shells 21 and 33 may be welded as at 35 as described. In the event it is desired to use a cementing compound as described, the cement may be a high temperature-resistant plastic cement, such as a phenolic resin or silicon cement, or a metallic solder or any other material that may have the ability to connect, as by cementing, the two sheet metal shells together. In such assembly, the cement is applied to the inner surface of the shell 21 in sufficient quantity to cover the entire area of the surface and, in addition, upon assembly of the shells, to be squeezed between the surfaces of the shells to flow between the edges of the slots and the vane tabs along the marginal edges of the vanes and to enter the spaces between the vanes and the inner surface of the shell 33. This cementing operation connects the shells and will also provide a seal for the vanes with respect to the shell 33 to prevent any flow of the circulating fluid through spaces between the vanes and the shell due to tolerances allowed in the manufacture of such parts. It will be understood that the welds 35 are sufficient to effect the fixing of the vaned assembly with respect to the shell 21, while the use of the cement as a connecting and sealing agent is optional additive provisional safety measure. It will be apparent, that if a sufficient amount of the cement is provided between the shells, the cement can flow between the vane tabs and the edges of the slots of the shell and along the edges of the vanes to provide a seal between the vanes and shell. In such event, it may be desirable, in the assembly operation, that the shell 21 be positioned upon, with its outer curved surface engaging, a flat horizontal surface to insure the flow of cement along the edges of the vanes.

Fig. 3 illustrates another embodiment of the invention in which the impeller 11' comprises a casing or shell 21' and a shell 53, the shell 53 having an annular flange 54 extending axially thereof and in overlapping relation to the flange 22' of the drive plate 20' and having its edge terminating at the edge of the flange 23' of the shell 21', the adjacent edges of the flange 23' and the flange 54 lying in a radial plane and these edges being connected to the flange 22' of the drive plate 20' by a continuous weld 55 extending circumferentially about the flange 22' and connecting the edges of the flanges 23' and 54 to the drive plate 20', the weld 55 being effective to not only prevent relative movement of the shells 53 and 21' and thereby the vaned assembly with respect to the shell 21' but also to provide a connection fixing the shell 21' and the shell 53 to the drive plate 20'. It will be apparent, in this embodiment of the invention, it is unnecessary to provide a separate welding operation for connecting the shell 21' to the shell 53 as the weld 55 will be effective to perform this function. As in the embodiment of the invention illustrated in Figs. 1 and 2, a cement may be applied to the inner surface of the shell 21' to provide a further connection of the shell 53 to the shell 21' and which cementing operation, as previously described, is also effective to provide a seal between the edges of the vanes 37' and the inner surface of the shell 53.

I wish it to be understood that my invention is not to be limited to the specific construction of hydrodynamic coupling devices or to the specific methods for making the same which are shown and described, except only insofar as the claims may be so limited, as it will be apparent to those skilled in the art that changes may be made without departing from the principles of the invention. In particular, I wish it to be understood that the invention is not to be limited to torque-converting coupling devices to the exclusion of non-torque converting coupling devices, unless the claims are so limited. While the invention is illustrated in connection with an impeller element of a hydrodynamic coupling device, the same arrangement and method for making the vaned element may be used with other vaned elements of a hydrodynamic coupling device and I do not intend to limit my invention to any particular element of a hydrodynamic coupling device unless the claims are so limited.

I claim:

1. In a hydrodynamic coupling device, first and second hollow casings defining a fluid-containing housing and having radially outer portions in telescoping relation; a vaned assembly within said first casing and including a hollow shell having slots extending therethrough, said shell having its outer surface engaging the inner surface of said first casing and a radially outer portion engaging said portions of said first and second casings, a core ring within said shell and having radially spaced slots extending therethrough, a plurality of vanes between said shell and core ring and having arcuate margins in engagement with the inner surface of said shell and the outer surface of said core ring, tabs on said vane margins and projecting through said slots in said shell, and projecting through the slots in said core ring and engaging the inner surface of said core ring; and means on said shell outer portion and said second casing disposed in engagement therewith preventing axial movement of said shell toward said second casing or of said second casing toward said shell.

2. In a hydrodynamic coupling device, first and second hollow casings defining a fluid-containing housing and having radially outer portions in telescoping relation; a vaned assembly within said first casing and including a hollow shell having slots extending therethrough, said shell having its outer surface engaging the inner surface of said first casing, said shell including a radially outer portion telescoping said portion of said first casing and further including an axially facing and radially extending edge, means defining an axially facing and radially extending edge on said second casing abutting said axially facing shell edge to prevent axial movement of said shell toward said second casing and vice-versa, a core ring within said shell and having slots extending therethrough, a plurality of vanes between said shell and core ring and having arcuate margins in engagement with the inner surface of said shell and the outer surface of said core ring, tabs on one of said vane margins and projecting through said slots in the said shell and tabs on the other of said vane margins and projecting through the slots in said core ring and engaging the inner surface of said core ring; and means connecting said telescoping portions of said casing to each other, and said telescoping portions of said shell and said first casing.

3. In a hydrodynamic coupling device as defined in claim 2 wherein the connecting means is a continuous weld between the outer surface of the radially outer portion of the second casing and the edge of the radially outer portion of the first casing, and a plurality of spaced welds connects the inner surface of the radially outer portion of the second casing and outer surface of the radially outer portion of the shell.

4. In a hydrodynamic coupling device, first and second substantially semi-toroidal casings defining a fluid-containing housing and having radially outer portions in telescoping relation; a vaned assembly within said first casing and including a substantially semi-toroidal shell having slots extending therethrough, said shell having its outer surface engaging the inner surface of said first casing and a radially outer portion telescoping said portion of said first casing with the radially outer edges of said shell portion and said portion of said first casing terminating generally adjacent each other, a core ring within said shell and having slots extending therethrough; a plurality of vanes between said shell and core ring and having arcuate margins in engagement with the inner surface of said shell and the outer surface of said core ring, tabs on one of said vane margins and projecting through said slots in said shell and tabs on the other of said vane margins and projecting through the slots in said core ring and engaging the inner surface of said core ring; and unitary means fixedly connecting said telescoping portions of said casing to each other, connecting said telescoping portions of said shell and said first casing, and connecting said telescoped shell portion and said second casing.

5. In a hydrodynamic coupling device, first and second substantially semi-toroidal casings defining a fluid-containing housing and having radially outer portions in telescoping relation; a vaned assembly within said first casing and including a substantially semi-toroidal shell having slots extending therethrough, said shell having its outer surface engaging the inner surface of said first casing and a radially outer portion telescoping said portion of said first casing with the radially outer edges of said shell portion and said portion of said first casing terminating generally adjacent each other; a plurality of vanes in said shell and having arcuate margins in engagement with the inner surface of said shell, tabs on said vane margins and projecting through said slots in said shell; and unitary means fixedly connecting said telescoping portions of said casings to each other, connecting said telescoping portions of said shell and said first casing, and connecting said telescoped portion of said shell and said second casing, including a continuous weld between the outer surface of the radially outer portion of the second casing and said edges of said shell and first casing radially outer portions.

References Cited in the file of this patent

UNITED STATES PATENTS

| 2,115,895 | Weihmann | May 3, 1938 |
| 2,140,106 | Cox et al. | Dec. 13, 1938 |
| 2,205,054 | Wemp | June 18, 1940 |
| 2,340,494 | Smirl | Feb. 1, 1944 |
| 2,503,025 | Bolender | Apr. 4, 1950 |
| 2,588,668 | Syrovy | Mar. 11, 1952 |